United States Patent [19]
Silverstein et al.

[11] Patent Number: 6,166,800
[45] Date of Patent: Dec. 26, 2000

[54] SOLID-STATE IMAGE CAPTURE SYSTEM INCLUDING H-PDLC COLOR SEPARATION ELEMENT

[75] Inventors: Louis D. Silverstein, Scottsdale, Ariz.; Thomas G. Fiske, Campbell; Haiji Yuan, Cupertino, both of Calif.

[73] Assignee: Xerox Corporation, Stamford, Conn.

[21] Appl. No.: 09/221,995

[22] Filed: Dec. 29, 1998

[51] Int. Cl.[7] ............................. G02F 1/13; G02F 1/1335
[52] U.S. Cl. .......................... 349/201; 349/175; 349/115
[58] Field of Search ................................ 349/201, 2, 162, 349/74, 78, 88, 92, 113, 115, 175

[56] References Cited

U.S. PATENT DOCUMENTS

| | | | |
|---|---|---|---|
| 4,596,445 | 6/1986 | Fergason | 350/339 |
| 4,952,033 | 8/1990 | Davis | 350/351 |
| 5,124,818 | 6/1992 | Conner et al. | 359/53 |
| 5,193,015 | 3/1993 | Shanks | 359/53 |
| 5,200,845 | 4/1993 | Crooker et al. | 359/51 |
| 5,539,548 | 7/1996 | Yamazaki et al. | 359/53 |
| 5,729,320 | 3/1998 | Eidenschink et al. | 349/166 |
| 5,751,452 | 2/1999 | Tanaka et al. | 359/52 |
| 5,875,012 | 2/1999 | Crawford et al. | 349/74 |

OTHER PUBLICATIONS

Tanaka, K. et al., "18.1: Optimization of Holographic PdLC for Reflective Color Display Applications," SID 95 Digest, pp. 267–270, 1995.

Tanaka, K. et al., "A Liquid–Crystal/Polymer Optical Device Fotmed by Holography for Reflective Color Display Applications," NTT, Interdisciplinary research Laboratories, pp. 109–111.

Date, M. et al., S24–2: Three–Primary–Color Holographic Polymer Dispersed Liquid Crystal (HPDLC) Devices For Reflective Displays, Asia Display 95, pp. 603–606, 1995.

Kreuzer, M. et al., "New Liquid Crystal Display with Bistability and Selective Erasure Using Scattering in Filled Nematics," Appl. Phys. Lett. 62 (15), 1993, pp. 1712–1714.

Crawford, G.P. et al., "Reflective Color LCDs Based on H–PDLCand PSCT Technologies," 4 pp.

Crawford, Gregory P. et al., "Reflective Color Display for Imaging Applications," IS&T/SID 1995 Color Imaging Conference: Color Science, Systems and Applications, pp. 52–58.

Tanaka, Keiji et al., "Holographically Formed Liquid–Crystal/Polymer Device for Reflective Color Display," Journal of the SID 2/1, 1994, pp. 37–40.

Crawford, G.P. et al. Ed., "Liquid Crystals in Complex Geometries: Formed by Polymer and Porous Networks," Taylor & Francis, 1996, pp. 103–142, 255–264 265–280, and 307–324.

*Primary Examiner*—Kenneth Parker
*Assistant Examiner*—Mike Qi
*Attorney, Agent, or Firm*—Oliff & Berridge, PLC

[57] ABSTRACT

A full-color image capture system includes a color separation element and a single image sensor array. The color separation element can be operated in either a light reflective (mirror) mode in which selected intrinsic colors are reflected onto the image sensor array, or a light transmissive (filter) mode in which selected colors are transmitted to produce subtractive primary color images. The color separation element can be formed of holographic polymer dispersed liquid crystal materials that reflect light of selected intrinsic colors. The color separation element can include three holographic polymer dispersed liquid crystal material layers so that three different intrinsic colors can be selectively reflected or transmitted onto the image sensor to provide a full-color image.

26 Claims, 7 Drawing Sheets

FIG. 4
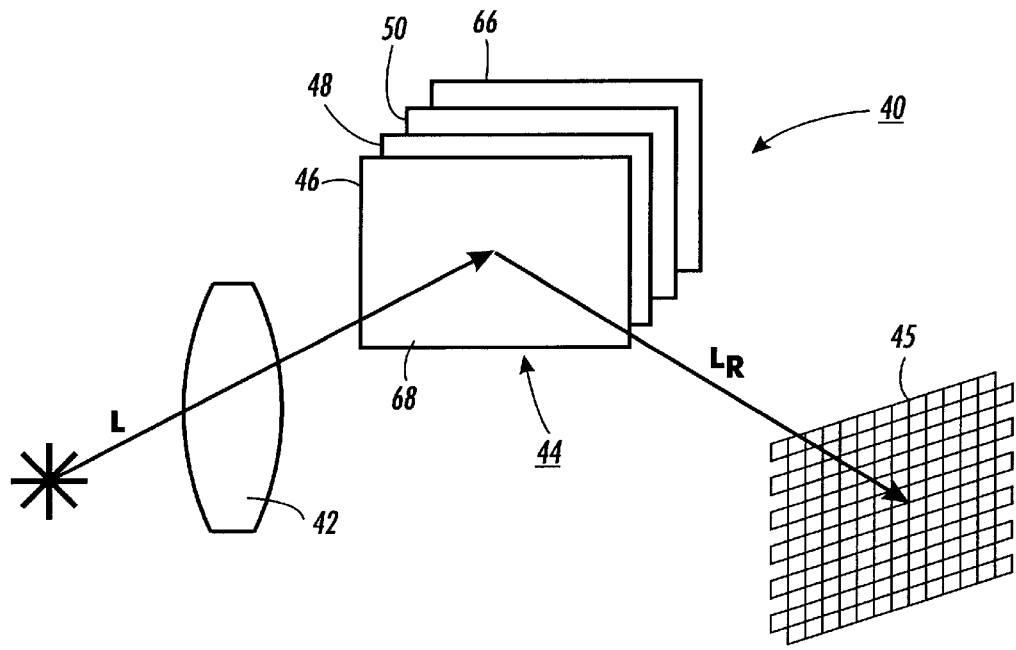
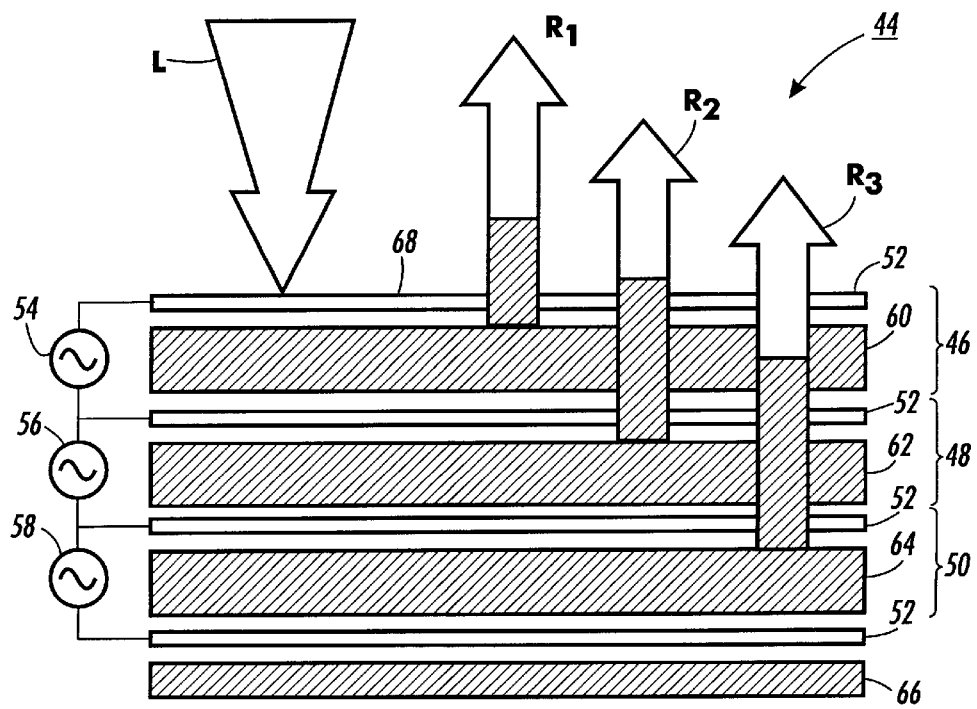
FIG. 5

SOLID-STATE IMAGE CAPTURE SYSTEM INCLUDING H-PDLC COLOR SEPARATION ELEMENT

BACKGROUND OF THE INVENTION

1. Field of Invention

This invention is directed to the field of image capture systems. More particularly, this invention is directed to a solid-state image capture system that includes a holographic polymer dispersed liquid crystal color separation element that can be operated in either a light reflective mode or a transmissive mode to provide fill-color images.

2. Description of Related Art

A new generation of full-color image capture systems based on using solid-state image sensors has enabled digital imaging to penetrate the consumer marketplace. These new systems include both digital cameras for the capture of still images and small video cameras for moving images. Most of the systems in existence today utilize charge coupled devices (CCD) image sensors arrays; however, there are currently many large initiatives for the development of complementary metal oxide semiconductor (CMOS) sensor arrays, and some CMOS-based digital cameras have entered the market. The consumer market for image capture systems is already large and is rapidly growing. This is partially fueled by the Internet and World Wide Web, but is also strongly driven by the allure of digital photography and the availability of low-cost, high-quality color printers capable of rendering photographic quality images. The market for digital camera systems is expected to reach several billion dollars within the next few years and is, of course, highly competitive and cost sensitive.

The principal performance and cost factor for these digital image capture systems is the image sensor itself. In order to minimize the cost of these new color image capture systems and to provide a form factor (i.e., physical size or volume) comparable to film-based cameras, most systems utilize a single image sensor. Color separation is accomplished by a spatially patterned array of red, green and blue (RGB) color absorption filters overlayed upon the image sensor array. The technical challenge for this approach is to utilize the fill spatial resolving capacity of the image sensor while still providing effective color separation. Some method must be incorporated to estimate the "true" luminance signal at each sensor location in the filtered image sensor array. Then, attempts must be made to estimate the color or chromaticity at each sensor location. For example, a digital camera system designed to capture images at a sampling density of 1024×768 pixels will typically contain a single image sensor array of 1024×768 sensors with a patterned overlay of red, green and blue color separation filters. From the single signal generated at each sensor location, three, 8-bit color signals for each of the 1024×768 sensor locations must be "reconstructed" or derived to provide a full-color image at the resolution of the sensor. This 1024×768×24-bit image is then stored in the camera (usually in compressed form) and subsequently transferred to a computer system for imaging on a display or for printing on a color printer.

FIG. 1 schematically illustrates an example of this most common configuration of color image capture system 20 in a color digital camera, a single-path sensor system. The image capture system 20 includes a lens 22 and a two-dimensional sensor array (e.g., charge coupled device array) with an integral Beyer color filter (red-green-green-blue) pattern 24 having a redundant green element 26. This particular color filter pattern is commonly used in charge coupled device-based color video cameras. The higher density of green-filtered sensors enhances the effectiveness of estimating the spatial luminance pattern. The class of methods for reconstructing the three, 8-bit color signals at each pixel location are known as "de-mosaicing operations" and are most commonly based upon linear interpolation and block replication procedures. Methods of feature estimation via templates have also been used.

FIG. 2 illustrates a second known approach to color separation for digital cameras, a three-path sensor system. The color separation system 30 includes prism optics and dichroic elements 32 to separate incoming light into three different broad spectral regions $C_1$, $C_2$ and $C_3$, which are then imaged on three separate image sensor arrays, 34, 36 and 38, respectively. In principle, this approach preserves color image integrity and eliminates the need for de-mosaicing and its associated system overhead. This approach is typified by the Minolta RD-175 digital camera.

The most recent approach that has been proposed for color separation in image capture systems is based on temporal imaging (also known as field-sequential imaging) of red, green and blue image components onto a single sensor array. This approach has the potential cost and form factor advantages of single-path sensor systems and the more complete and efficient color separation performance of three-path sensor systems. While no known systems of this type currently exist in consumer level products, a field-sequential color separation element based upon fast-switching, nematic liquid crystal π cells has been proposed.

SUMMARY OF THE INVENTION

Known digital image capture systems have not proven completely satisfactory for a number of reasons. The principal disadvantages of known image capture systems that include a single-path sensor system and use de-mosaicing methods are color image artifacts arising from imperfect reconstruction or derivation of the full-color image, system processing overhead required by the de-mosaicing operations, and non-optimal color separation and light throughput efficiency due to limitations of the color absorption filters comprising the color selection filter mosaic overlaying the sensor array. These limitations are at least partly the consequence of constraints involving the use of color filter materials which must be compatible with manufacturing processes for the sensor array. Color image artifacts of various types arise depending on the filter mosaic and de-mosaicing approach used in the particular image capture system. The most common color image artifacts observed in existing systems are spatial blurring or loss of image detail, blocking artifacts, false contouring and chromatic noise in shadow detail or relative low lightness regions of processed images. The same kinds of limitations and image artifacts apply for acquiring high-resolution monochrome images with a single-path sensor system that is also used to acquire color images.

The three-path sensor system, as illustrated in FIG. 2, also has disadvantages. The three-path sensor system 30 is more costly than the single-path sensor system due to the need for three image sensors 34, 36 and 38, as well as the prism optics and dichroic elements 32 required to produce the three separate color channels $C_1$, $C_2$ and $C_3$. Moreover, the three-path approach and its associated components result in relatively large camera systems with an undesirable form factor. These camera systems tend to be much larger and bulkier than the single-lens reflex camera bodies on which they are based. Another disadvantage of known three-path color camera systems is relatively poor color separation due to the use of dichroic elements which pass broad spectral regions either above or below a specific spectral cutoff point. These systems are also prone to passing non-visible wavelengths to the sensor array, which limits the performance of the system in the visible portion of the spectrum.

The concept of a field-sequential π cell color shutter for color separation also suffers from a number of disadvantages. First, the color separation performance is limited by the dichroic dyes used in color polarizers and is not easily tunable for particular image sensors. Second, because color separation is based on polarization-dependent absorption filters, the light throughput efficiency is relatively low. FIG. 3 shows the measured spectral transmission of a typical π cell color shutter proposed for use in digital cameras. Third, π cells require a bias voltage be applied to, and maintained on, each liquid crystal cell to maintain the alignment of the liquid crystal molecules in the π configuration. Moreover, after application of the bias voltage, the liquid crystal molecules may take several seconds to align into a stable π cell configuration. The requirement for maintenance of such a bias voltage is undesirable for battery-powered camera systems. Fourth, there is significant spectral overlap between the blue and green transmission states and the green and red transmission states. This results in inadequate separation of the blue and green images and the green and red images and therefore degrades color image quality.

This invention provides an image capture system that includes a liquid crystal color separation element that can be operated in either a light reflective (mirror) mode, or a light transmissive (filter) mode to provide high-quality, full-color and high-resolution monochrome images.

This invention separately provides an image capture system that includes a holographic polymer dispersed liquid crystal (H-PDLC) color separation element that can achieve full-color images based on either the additive or subtractive primary colors.

This invention separately provides an image capture system that includes a holographic polymer dispersed cholesteric liquid crystal light separation medium that can achieve full-color images.

This invention separately provides an image capture system that can include only a single image sensor.

The color separation element of this invention can achieve color separation of incident light by the use of temporal switching in either the reflective or transmissive modes to sequentially image color components onto only a single image sensor.

An image capture system according to this invention comprises a lens, a color separation element and an image sensor. The image sensor can be an image sensor array. The color separation element receives incident light that is focused by the lens. The color separation element includes at least one pair of substrates and a color separation medium between each of the pairs of substrates. The color separation medium can comprise a holographic polymer dispersed liquid crystal material. The holographic polymer dispersed liquid crystal color separation mediums each reflect light of a selected intrinsic color of the incident light and simultaneously transmit light of substantially all intrinsic colors of the incident light exclusive of the reflected intrinsic color. The image sensor is selectively positionable relative to the color separation element to sense either the light that is reflected in the reflective (mirror) mode, or the light that is transmitted in the transmissive (filter) mode, by the holographic polymer dispersed liquid crystal color separation mediums.

The image capture system can comprise a plurality of pairs of substrates and associated holographic polymer dispersed liquid crystal color separation mediums formed between the respective pairs of substrates. The image capture system typically comprises three holographic polymer dispersed liquid crystal color separation mediums that can reflect red, green and blue light, respectively, to provide full-color images.

The color separation element can comprise a voltage source associated with each pair of substrates and holographic polymer dispersed liquid crystal color separation medium, together forming a cell. The holographic polymer dispersed liquid crystal color separation mediums reflect light of a selected intrinsic color in the field-off state, and transmit substantially all colors when the applied voltage is above a threshold voltage. Accordingly, by selectively and independently applying voltage to different cells, the non-powered cells can reflect light of selected intrinsic colors, and the powered cells can transmit all other intrinsic colors. The reflected colors can be combined additively and the transmitted colors can be combined by subtractive color mixing, to achieve full-color images in reflective or transmissive operational modes.

According to another aspect of the image capture system of this invention, the image capture system can comprise a first image sensor to sense the intrinsic colors that are reflected by the color separation element, and a second image sensor to sense the transmitted subtractive primary colors, so that the image capture system can be operated selectively in either the reflective mode or the transmissive mode.

This invention also provides methods of separating intrinsic colors of light.

These and other features and advantages of this invention are described in, or are apparent from, the following detailed description of the image capture systems according to this invention.

BRIEF DESCRIPTION OF THE DRAWINGS

Various embodiments of this invention will be described in detail, with reference to the following figures, wherein:

FIG. 4 illustrates an exemplary image capture system according to this invention, which comprises a holographic polymer dispersed liquid crystal (H-PDLC) color separation element that functions as a color separation mirror;

FIG. 5 illustrates an exemplary embodiment of a color separation element including holographic polymer dispersed liquid crystal color separation mediums for use in the image capture system of FIG. 4;

DETAILED DESCRIPTION OF PREFERRED EMBODIMENTS

FIG. 4 shows an exemplary image capture system 40 according to this invention. The image capture system 40 can be a full-color image capture system such as a digital camera and can capture still and/or moving images. The image capture system 40 comprises a lens 42, a color separation element 44, and an image sensor array 45. The lens 42 focuses and directs light L onto the color separation element 44. In this exemplary embodiment, the color separation element 44 operates in the reflective mode as a color separation mirror. The light that is reflected by the color separation element 44 is directed onto an image sensor such as the image sensor array 45.

The lens 42 can be any suitable single lens or a lens system for focusing the incident light L onto the color separation element 44.

Figure 1:
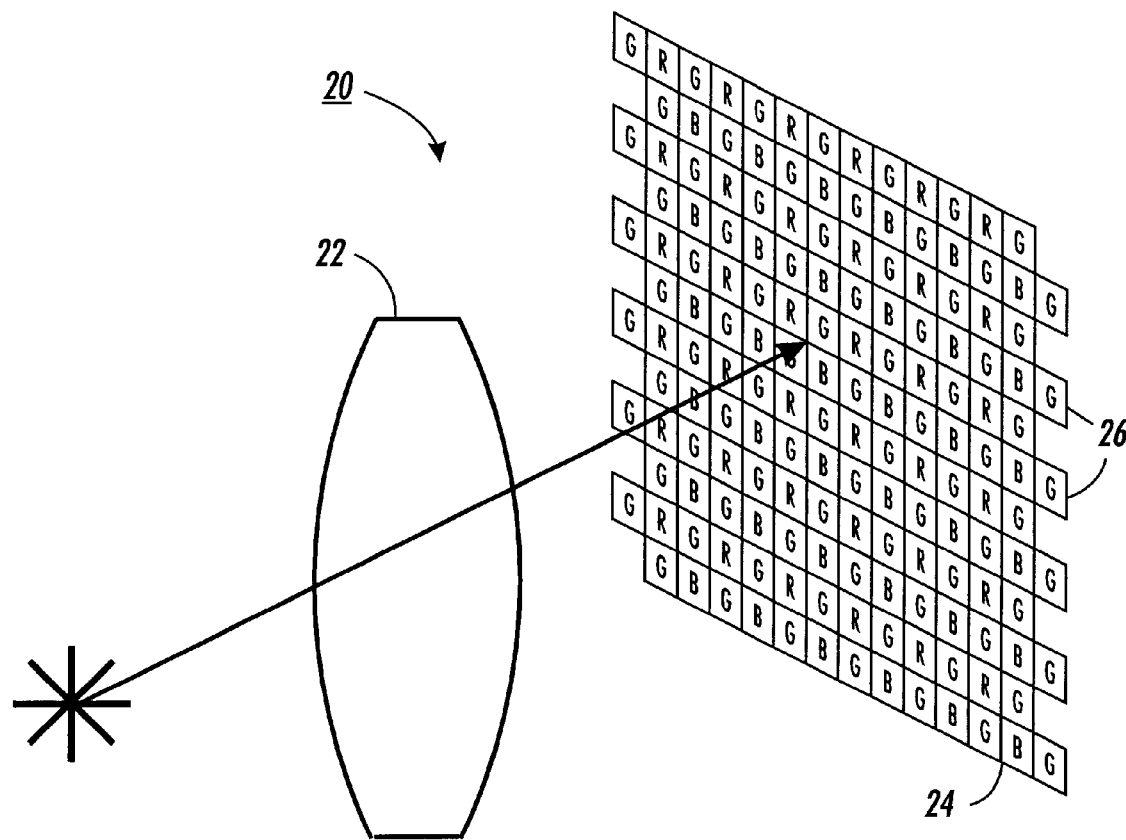
FIG. 1 schematically illustrates a conventional image capture system that includes a single filtered sensor array.
Figure 2:
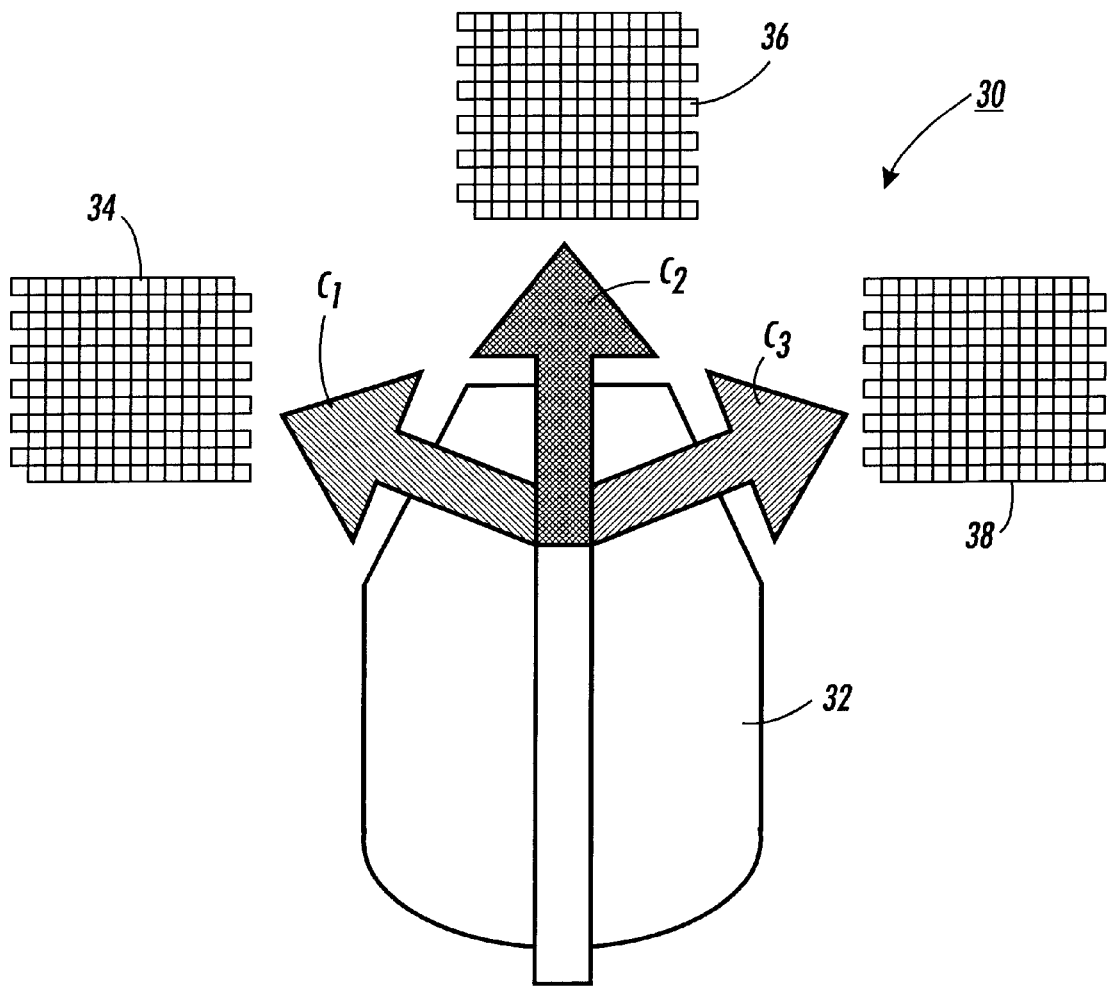
FIG. 2 schematically illustrates another conventional image capture system that includes prism optics, dichroic elements and three separate image sensor arrays.

The image sensor array 45 can be, for example, an ordered array of complementary metal oxide silicon (CMOS) devices or a charge coupled devices (CCD). Any other known or later developed image sensor technology can also be used in the image capture system 40. The image sensor array 45 comprises a uniform array of monochrome sensors and can provide a substantially higher spatial resolving capacity than image sensors of comparable device density having patterned filter arrays, such as the image sensor 24 shown in FIG. 1.

An exemplary color separation element 44 is illustrated in FIG. 5. The color separation element 44 comprises three cells 46, 48 and 50. The cells 46, 48 and 50 each include a pair of opposed substrates 52 whose base material may be any transparent medium such as glass or plastic, which are each coated with an electrically conductive, optically transparent material, such as indium tin oxide (ITO), and also a voltage source 54, 56 and 58, respectively, electrically connected to the pairs of substrates 52. The cells 46, 48 and 50 include color separation mediums 60, 62 and 64, respectively. The color separation element 44 can also include a black absorbing material 66 at a rear end to absorb non-reflected light wavelengths.

The color separation mediums 60, 62 and 64 of the respective cells 46, 48 and 50, can comprise holographic polymer dispersed liquid crystal (H-PDLC) materials. These materials exhibit high-efficiency Bragg reflection at selected wavelengths and, thus, at selected intrinsic colors. Holographic polymer dispersed liquid crystal mediums are fabricated by exposing a mixture of liquid crystal and polymer materials to an optical standing wave pattern created by interfering coherent light beams. The standing wave pattern causes the phase separation of the liquid crystal and polymer materials in the mixture, creating a stratified structure including alternating polymer-rich and liquid-crystal-rich layers. Once the phase separation of the mixture into the layered structure is completed, the stratified structure can be "locked in" by curing with ultraviolet radiation. The periodic structure that is created exhibits alternating layers of different refractive indices in the field-off state, in which no voltage is applied to the color separation medium. In the field-off state, the different refractive indices of the layers cause constructive interference and high-efficiency Bragg reflection centered about the desired Bragg wavelength.

The Bragg wavelengths of the polymer/liquid crystal mixtures that form the color separation mediums 60, 62 and 64 can be varied by selecting the wavelengths and/or incident angles of the light beams that irradiate the mixtures. Typically, two laser beams are used to fabricate the multi-layer structure in polymer/liquid crystal mixtures. The reflected (Bragg) wavelength is changed by controlling the period of the refractive index modulation. Exemplary methods of forming holographic polymer dispersed liquid crystal mediums that are suitable for use in image capture systems according to this invention are described in "Reflective Color Displays for Imaging Applications," by G. P. Crawford et al., in Proceedings of the IS & T/SID 1995 Color Imaging Conference: Color Science, Systems and Applications, pp. 52–58; and in U.S. patent application Ser. Nos. 09/141,969 and 09/140,479, both filed on Aug. 28, 1998; and U.S. patent application Ser. No. 08/792,268, filed Jan. 31, 1997, each incorporated herein by reference in its entirety.

As disclosed in U.S. patent application Ser. No. 08/792, 269, filed Jan. 31, 1997, and incorporated herein by reference in its entirety, the holographic polymer dispersed liquid crystal materials that comprise the color separation mediums 60, 62 and 64 can be formed to include groups of alternating liquid-crystal-rich and polymer-rich layers, with each group of layers being reflective of a different wavelength of light. These holographic structures can reflect multiple, closely spaced wavelengths of a selected color as represented by separate reflectance sub-peaks, each having a separate spectral bandwidth. These sub-peaks together relate to spectral peaks having broader bandwidths.

The cells 46, 48 and 50 can include holographic polymer dispersed liquid crystal color separation mediums 60, 62 and 64, respectively, that are each reflective of light of a different intrinsic color $R_1$, $R_2$ and $R_3$, respectively, in the field-off state. In the field-off state, no voltage is applied across the cells 46, 48 and 50 by the voltage sources 54, 56 and 58. In this field-off state, the refractive index of the liquid crystal material $n_{LC}$ is different from the refractive index of the polymer $n_p$. Light of a finite spectral bandwidth centered about the Bragg wavelength is thus reflected from the holographic polymer dispersed liquid crystal mediums. The color separation element 44 can be formed to reflect the additive primary colors red, green and blue. That is, the color separation medium 60 can be formed to reflect blue light, the color separation medium 62 can be formed to reflect green light, and the color separation medium 64 can be formed to reflect red light in the field-off state. Accordingly, in the field-off state, the color separation element 44 can reflect blue, green and red light. The reflected colors can be mixed according to the rule of additive color mixing to achieve all colors.

Another advantage of this invention is that the reflection direction of the holographically formed color separation mediums 60, 62 and 64 can be made to be away from the surface reflection of the color separation element 44. This can be achieved by setting the two interfering laser beams at appropriate angles so that the interfering fringe layer are tilting away from the substrates 52. This will separate the surface reflection or glare component of the reflected light away from the reflected light of the different intrinsic colors $R_1$, $R_2$ and $R_3$. The reflected intrinsic colors $R_1$, $R_2$ and $R_3$ are directed to the image sensor array 45 and the glare component is directed out of the image path to a light trap. The effective removal of the glare component from the reflected light $L_R$ path achieves better color separation and improves the sensitivity of the image capture system 40 by keeping uncontrolled and unmodulated light from going into the image sensor array 45.

Figure 6:
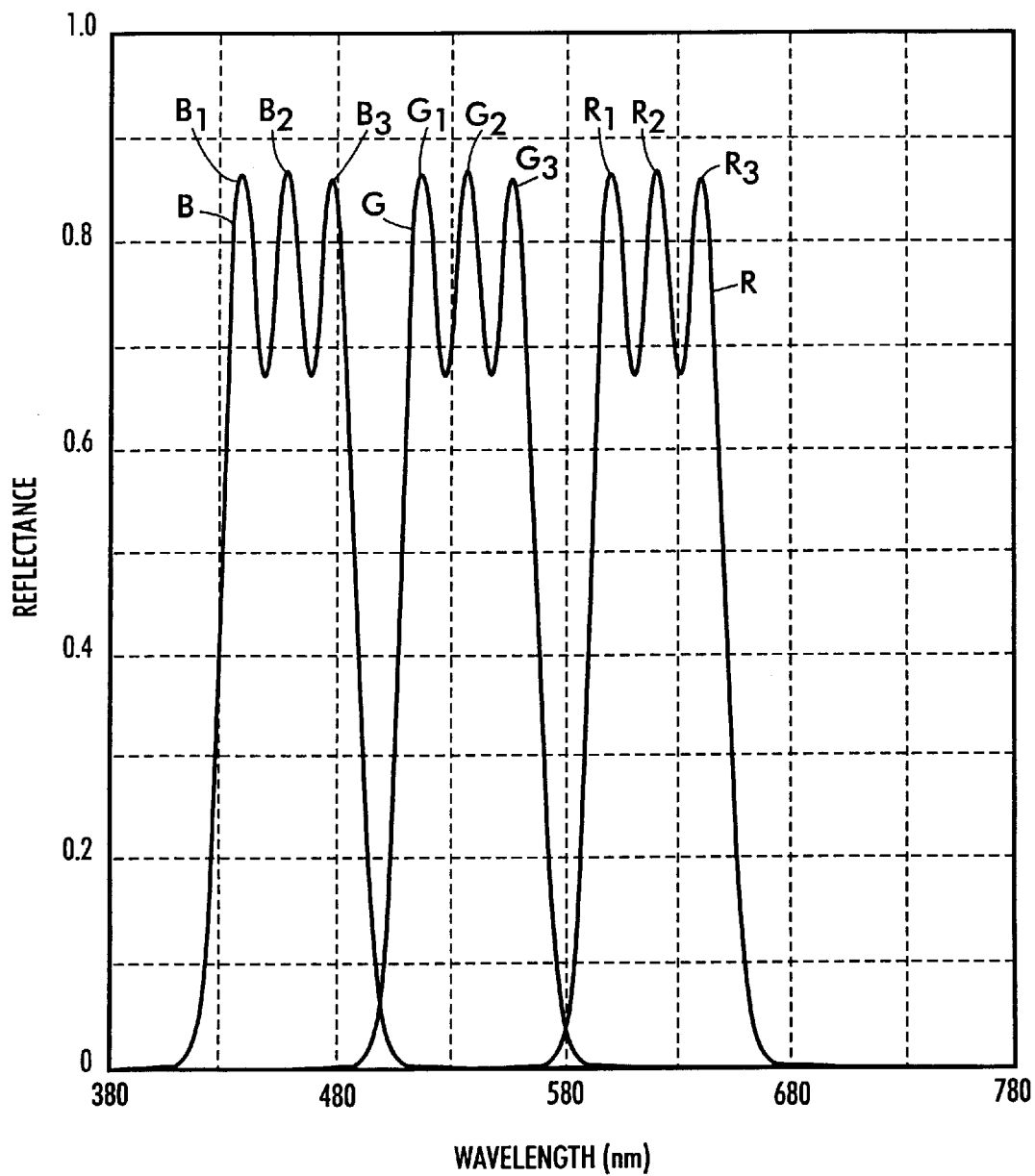
FIG. 6 illustrates one possible set of spectral reflectance functions (i.e., spectral reflectance versus light wavelength) of a holographic polymer dispersed liquid crystal separation element of the image capture system of FIG. 4.

FIG. 6 shows a plot of the modeled spectral reflectance versus wavelength for the color separation element 44 in which the color separation mediums 60, 62 and 64 reflect closely spaced wavelengths of blue (B), green (G) and red (R) light, respectively. This plot is exemplary of only one of an infinite variety of spectral reflectance functions achievable with the holographic polymer dispersed liquid crystal color separation element 44. As shown, the peaks B, G and R each include separate reflectance sub-peaks each having a separate bandwidth. The blue peak B includes the sub-peaks $B_1$, $B_2$ and $B_3$; the green peak G includes the sub-peaks $G_1$, $G_2$ and $G_3$; and the peak R includes the sub-peaks $R_1$, $R_2$ and $R_3$.

Optionally, the color separation mediums 60, 62 and 64 can be formed to reflect respective different intrinsic colors having single reflectance peaks B, G, R, a different number of sub-peaks, or some other combination of intrinsic colors.

In the field-on state, the voltage sources 54, 56 and 58 can selectively apply a voltage to the holographic polymer dispersed liquid crystal color separation mediums 60, 62 and 64, respectively, to cause the holographic polymer dispersed liquid crystal material to transmit light that was formerly reflected in the field-off state. When a certain threshold voltage level is applied, re-orientation of the liquid crystal molecules causes the refractive index $n_{LC}$ of the liquid crystal material to become approximately equal to the refractive index $n_p$ of the polymer material, and the periodic refractive index modulation of the holographic polymer dispersed liquid crystal material is effectively removed. Consequently, in the field-on state all incident light is effectively transmitted by the holographic polymer dispersed liquid crystal material to which the threshold voltage is applied. The different cells 46, 48 and 50 of the color separation element can each have a different threshold voltage at which the cells display complete light transmission.

In principle, the color separation element 44 can operate in a reverse manner by the use of so-called negative liquid crystal materials; i.e., the holographic polymer dispersed liquid crystal color separation mediums can transmit light in the field-off state and reflect light in the field-on state.

A voltage can be selectively and independently applied to the color separation mediums 60, 62 and 64 by the respective voltage sources 54, 56 and 58, to cause the color separation mediums to selectively reflect or transmit light. As explained above, when no voltage is applied to one or more of the color separation mediums 60, 62 and 64, then light at and about the associated Bragg wavelengths is reflected from the color separation mediums to which no voltage is applied. To transmit light of one or more selected intrinsic colors, a threshold voltage can be applied to one or more of the color separation mediums 60, 62 and 64 to cause those mediums to transmit the incident light. For example, a voltage can be applied to the color separation mediums 62 and 64 by the voltage sources 56 and 58 while no voltage is applied to the color separation medium 60, so that the cell 46 reflects light of the associated Bragg wavelength of the color separation medium 60, and the cells 48 and 50 transmit intrinsic colors that are not reflected by the color separation medium 60.

During operation, the color separation element 44 of the image capture system 40 operates in the reflective mode as a color separation mirror. Light L that is incident on the lens 42 is focused by the lens 42 onto the color separation element 44. As explained above, the color separation element 44 can selectively reflect light of one, two or three different intrinsic colors from the cells 46, 48 and 50. The light $L_R$ that is reflected by the color separation element 44 is directed to the image sensor array 45. The image sensor array 45 can comprise a sensor array as schematically shown in FIG. 4.

Typically, the color separation element 44 is operated to separately reflect light of each of the three intrinsic colors that it can reflect onto the image sensor array 45, each for a predetermined amount of time in order to capture a full-color image. That is, the color separation element can be operated such that the cell 46 is in the field-off state and the cells 48 and 50 are each in the field-on state, so that blue light is reflected onto the image sensor array 45 for a predetermined amount of time in order to capture a blue portion of the full-color image. Similarly, the cell 48 can be in the field-off state while the cells 46 and 50 are each in the field-on state, so that the color separation element 44 reflects green light onto the image sensor array 45 for a predetermined amount of time in order to capture a green portion of the full-color image. Also, the color separation element 44 can be operated such that the cell 50 is in the field-off state and the cells 46 and 48 are each in the field-on state, so that red light is reflected onto the image sensor array 45 for a predetermined amount of time in order to capture a red portion of the full-color image. The image capture system 40 can be operated in different selected color reflection sequences. The color reflection sequence that is followed can be varied to reflect the colors in any selected order or pattern, and for any predetermined amount of time for each of the different colors.

Thus, by combining three holographic polymer dispersed liquid crystal cells 46, 48 and 50, each appropriately tuned and optimized, a highly efficient and selective color separation element 44 that functions as a color separation mirror can be provided to enable independent control of the spectral reflectance bands from each of the cells 46, 48 and 50.

High-resolution monochrome images can be acquired by operating the color separation element 44 in the following manner: Each of the cells 46, 48 and 50 are operated in the field-off state simultaneously for a predetermined amount of time. This results in the color separation element 44 reflecting light of each of the three intrinsic colors to the image sensor array 45 simultaneously so as to acquire an accurate, photopically-weighted monochrome image.

Figure 3:
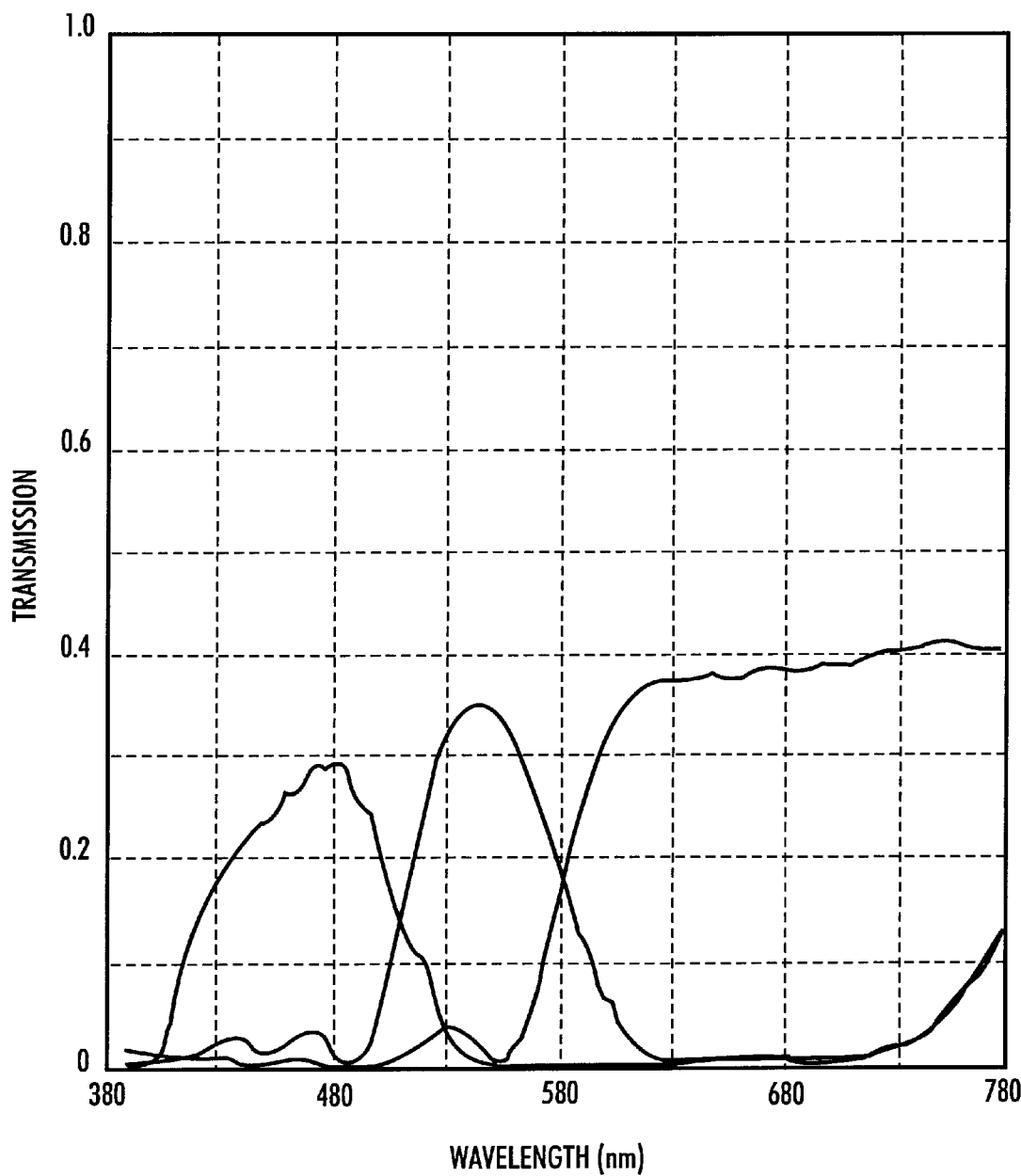
FIG. 3 shows the measured spectral transmission of a π cell color shutter.

Comparing FIG. 6 to FIG. 3, which illustrates the transmission versus wavelength performance for a π cell color shutter system, it is readily evident that the image capture system 40 can achieve relatively better light transmission throughput and more accurate spectral control than π cell color shutter systems. Accordingly, the image capture system 40 can achieve better images under low light level conditions. In addition, the image capture system 40 can substantially avoid "cross-talk" caused by overlap of adjacent spectral peaks that occur in π cell color shutter systems, as shown in FIG. 3.

Figure 7:
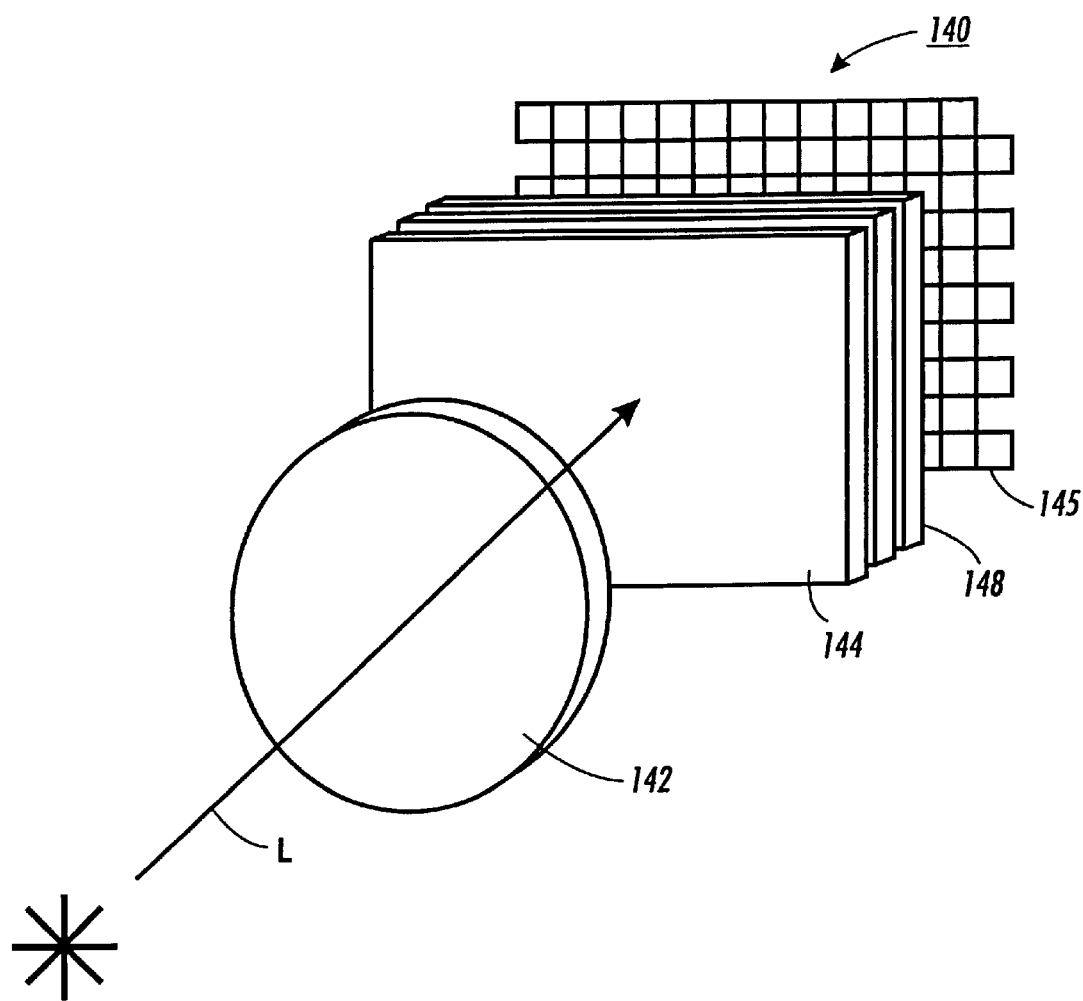
FIG. 7 illustrates another exemplary image capture system according to this invention, which comprises a holographic polymer dispersed liquid crystal color separation element that functions as a color separation filter.

FIG. 7 illustrates an exemplary image capture system 140 according to this invention that operates in the light transmissive (filter) mode as a color separation filter. The image capture system 140 includes a lens or lens system 142 to focus incident light onto the color separation element 144, which transmits light onto an image sensor such as the image sensor array 145. The color separation element 144 can have the same configuration as the color separation element 44 shown in FIG. 5. A difference between the configuration of the image capture system 140 and the image capture system 40 is the position of the image sensor array 145 relative to the color separation element 144 as compared to the positioning of the image sensor array 45 relative to the color separation element 44. The image capture system 140 comprises a straight through optical path. This difference in positioning of the image sensor arrays 45 and 145 in the respective image capture systems 40 and 140 is due to the light being reflected from the color separation mediums 60, 62 and 64 and exiting the color separation element 44 via the light inlet surface 68 of the color separation element 44 of the image capture system 40, in contrast to the light being transmitted through the color separation mediums 60, 62 and 64 of the color separation element 144 and emerging from the light outlet surface 148. In the image capture systems 40 and 140, the image sensor arrays 45 and 145, respectively, are positioned to receive the reflected and transmitted light, respectively.

As explained above, the transmissive mode of the color separation element 144 is achieved when one or more of the cells of the color separation element 144, such as cells 46, 48 and 50 shown in FIG. 5 for the color separation element 40, are selectively operated in the field-on state. In this state, the applied electric field causes the refractive index $n_{LC}$ of the liquid crystal material to approximately equal the refractive index $n_p$ of the polymer material. The selected cells of the color separation element 144 that are subjected to an electric field transmit light and no reflection occurs from these cells. Cells of the color separation element 144 that are in the field-off state reflect light, as described above for the color separation element 40. Cells that are in the field-on state can transmit light of the colors that are not reflected by the cell in the off-state, such that the color separation element can provide subtractive color separation components of cyan (C), magenta (M) and yellow (Y). These colors are also referred to as the subtractive primary colors.

For example, one cell of the color separation element 144 can be in the field-off state and accordingly reflect an associated intrinsic color, while two other cells of the color separation element are simultaneously in the field-on state and accordingly transmit two respective different intrinsic colors that are not reflected by the cell in the field-off state. For example, red light can be reflected by one cell while blue and green light are transmitted by two other cells of the color separation element 144. The transmitted blue and green light will combine to produce the subtractive primary color cyan image at the image sensor array 145. Likewise, blue light can be reflected by one cell while red and green light are transmitted by two other cells. The transmitted red and green light will combine to produce the subtractive primary color yellow image at the image sensor array 145. Similarly, green light can be reflected by one cell in the field-off while blue and red light are transmitted by two other cells in the field-on state. The transmitted blue and red light will combine to produce the subtractive primary color magenta image at the sensor array 145.

Optionally, the color separation element 144 can be operated with two cells in the off-state and one cell in the on-state, so that two different intrinsic colors can be reflected and a third intrinsic color can be transmitted onto the image sensor array 145 for a predetermined amount of time. For example, cells of the color separation element 144 that reflect red and blue light can be in the field-off state, so that red and blue are reflected, while a third cell of the color separation element 144 can be in the field-on state so that it transmits a third color such as green.

Operation of the image capture system 140 in the transmissive mode can be particularly advantageous to transfer images directly to color hardcopy systems. In such case, the separation into the subtractive primaries cyan, magenta and yellow matches the hardcopy primaries and eliminates the need for transformations from red, green and blue to cyan, magenta and yellow.

Figure 8:
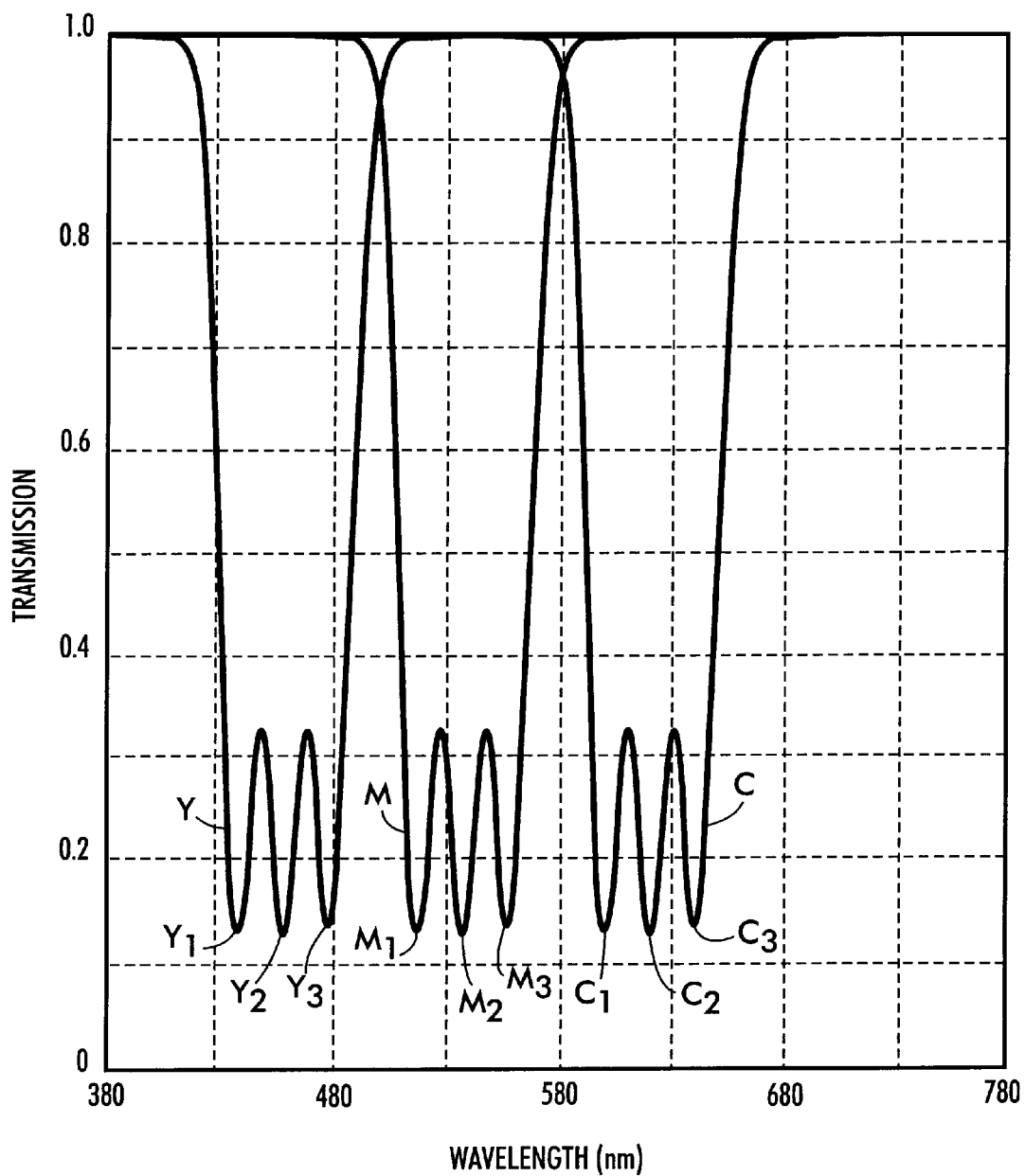
FIG. 8 illustrates one possible set of spectral transmission functions (i.e., spectral transmission versus light wavelength) of a holographic polymer dispersed liquid crystal color separation element of the image capture system of FIG. 7.

FIG. 8 shows a plot of the modeled spectral transmission versus light wavelength for the color separation element 144 including H-PDLC mediums that can transmit yellow (Y), magenta (M) and cyan (C) images. This plot is exemplary of only one of an infinite variety of spectral transmission functions achievable with an H-PDLC color separation element 144. As shown, each of the transmission curves for the three different colors includes separate transmission sub-troughs, each having a separate bandwidth. The yellow curve Y includes the sub-troughs $Y_1$, $Y_2$ and $Y_3$; the magenta curve M includes the sub-troughs $M_1$, $M_2$ and $M_3$; and the cyan curve C includes the sub-troughs $C_1$, $C_2$ and $C_3$. Each transmission sub-trough represents the light wavelengths removed from the transmission path due to the reflection characteristics of the H-PDLC media. For instance, the yellow transmission curve Y results from a set of "blue" H-PDLC layers reflecting blue light out of the transmission path; hence the light that is transmitted is deficient in blue light and relatively abundant in green and red light to result in yellow light transmission. The fact that there is some blue light (about 20%) left in the resulting transmission spectrum does not degrade image quality because this residual blue light can be accounted for during post image-capture processing. Optionally, the color separation mediums of the color separation element 144 can be formed to transmit different respective colors having single reflectance troughs Y, M, C, a different number of sub-troughs, or some other combination of intrinsic colors.

As in the image capture system 40, the color transmission sequence that is followed using the image capture system 140 can be varied to transmit intrinsic colors in any selected order or pattern, and for any predetermined amount of time. And, as in the image capture system 40, high-resolution monochrome images can be acquired by operating the cells of color separation element 144 in the field-on state for a predetermined amount of time. This results in the color separation element 144 transmitting light of all intrinsic colors to the image sensor array 145 simultaneously so as to acquire an accurate, photopically-weighted monochrome image.

According to another aspect of this invention, exemplary embodiments of the image capture system can comprise a single color separation element 44, and two separate image sensors, such as the image sensor arrays 45 and 145. Such image capture systems can simultaneously receive the light that is reflected and the light that is transmitted by the color separation element. That is, the light that is reflected by the cells of the color separation element can be directed to one image sensor such as the image sensor array 45 of the image capture system 40. The light that is transmitted by the cells of the color separation element can be directed to a second image sensor aligned with the color separation element as in the image capture system 140. Such image capture systems can thus provide the advantages of both the reflective (mirror) mode and the transmissive (filtering) mode in a single image capture system.

Thus, the use of holographic polymer dispersed liquid crystal materials in the cells of the color separation elements 44 and 144 can provide important advantages, but need not necessarily provide any particular advantage, for use in image capture systems 40 and 140 according to this invention. Particularly, the color separation elements can provide highly tunable center wavelengths, spectral bandwidths and peak reflectances and transmissions for each different intrinsic color component. In addition, the color separation elements can provide a high light throughput efficiency, and can be readily optimized for particular image sensor spectral responses and applications. Further, the color separation elements employing holographic polymer dispersed liquid crystal materials are capable of extremely fast switching times between field-off and field-on states, which is particularly advantageous for image capture systems based on field-sequential color separation. The color separation element 44 can be operated as a color separation mirror (reflective mode) producing additive red, green and blue color separations, while the color separation element 144 can be operated as a color separation filter (transmissive mode) to produce subtractive cyan, magenta and yellow color separations. In the reflective mode, the front glare can be removed from the image path thereby increasing image quality. In both reflective and transmissive modes, the image capture systems 40 and 140 can be made to acquire high-resolution, monochrome images as well as color images.

In addition, the image capture systems 40 and 140 comprise respective color separation elements 44 and 144 that can provide field-sequential color separation in combination with a single image sensor array 45 and 145, to form the basis of high-quality image capture systems at relatively low cost compared with other known approaches to color separation. The image capture systems 40 and 140 can be used in full-color digital cameras, such as digital still-image and video cameras. The image capture system 140 can be used in direct image transfer systems such as full-color hardcopy systems. Further cost reduction for the image capture system 40 may be obtained by taking advantage of the fact that each color separation lies on a slightly different focal plane, thereby allowing the use of inexpensive camera lenses which require little or no correction for axial chromatic aberration.

While this invention has been described in conjunction with the specific embodiments described above, it is evident that many alternatives, modifications and variations are apparent to those skilled in the art in view of this disclosure. Accordingly, the preferred embodiments of this invention as set forth above are intended to be illustrative and not limiting. Various changes can be made without departing from the spirit and scope of this invention.

What is claimed is:

1. An image capture system, comprising:
   a lens that focuses incident light;
   a color separation element disposed such that the incident light focused by the lens impinges on the color separation element, the color separation element including:
      a first pair of substrates;
      a first holographic polymer dispersed liquid crystal color separation medium between the first pair of substrates, the first holographic polymer dispersed liquid crystal color separation medium reflecting light of a first intrinsic color of the incident light and simultaneously transmitting light of all other intrinsic colors of the incident light exclusive of the first intrinsic color;
      a second pair of substrates;
      a second holographic polymer dispersed liquid crystal color separation medium between the second pair of substrates, the second holographic polymer dispersed liquid crystal color separation medium reflecting light of a second intrinsic color of the incident light and simultaneously transmitting light of all other intrinsic colors of the incident light exclusive of the second intrinsic color;
      a third pair of substrates; and
      a third holographic polymer dispersed liquid crystal color separation medium between the third pair of substrates, the third holographic polymer dispersed liquid crystal color separation medium reflecting light of a third intrinsic color of the incident light and simultaneously transmitting light of all other intrinsic colors of the incident light exclusive of the third intrinsic color;
   wherein the first, second and third holographic polymer dispersed liquid crystal color separation mediums (i) sequentially reflect the first, second and third intrinsic colors, respectively, and (ii) sequentially transmit light of substantially all intrinsic colors of the incident light exclusive of the first, second and third intrinsic colors, respectively;
   a first image sensor that is selectively positioned relative to the color separation element to either (i) sense the light of the first, second and third intrinsic colors that are sequentially reflected by the first, second and third holographic polymer dispersed liquid crystal color separation mediums, respectively, or to (ii) sense the light of substantially all intrinsic colors of the incident light exclusive of the first, second and third intrinsic colors that are sequentially transmitted by the first, second and third holographic polymer dispersed liquid crystal color separation mediums, respectively.

2. The image capture system of claim 1, wherein the first image sensor is positioned relative to the color separation element to sense the light of the first, second and third intrinsic colors that are sequentially reflected by the first, second and third holographic polymer dispersed liquid crystal color separation mediums, respectively.

3. The image capture system of claim 1, wherein the first image sensor is positioned relative to the color separation element to sense the light that is sequentially transmitted by the first, second and third holographic polymer dispersed liquid crystal color separation mediums.

4. The image capture system of clam 1, wherein the first, second and third intrinsic colors are red, green and blue, respectively.

5. The image capture system of claim 1, further comprising:
   a first voltage source that selectively applies a first voltage to the first pair of substrates;
   a second voltage source that selectively applies a second voltage to the second pair of substrates;
   a third voltage source that selectively applies a third voltage to the third pair of substrates;
   wherein:
      when the first, second and third voltages are zero, the first, second and third holographic polymer dispersed liquid crystal color separation mediums sequentially reflect light of the first, second and third intrinsic colors, respectively;
      when the first voltage has a first threshold voltage level, the first holographic polymer dispersed liquid crystal color separation medium transmits light of all intrinsic colors of the incident light;
      when the second voltage has a second threshold voltage level, the second holographic polymer dispersed liquid crystal color separation medium transmits light of all intrinsic colors of the incident light; and
      when the third voltage has a third threshold voltage level, the third holographic polymer dispersed liquid crystal color separation medium transmits light of all intrinsic colors of the incident light.

6. The image capture system of claim 5, wherein the first image sensor is positioned relative to the color separation element to sense the light of the first, second and third intrinsic colors that are sequentially reflected by the first, second and third holographic polymer dispersed liquid crystal color separation mediums, respectively, when the first, second and third voltages are respectively zero.

7. The image capture system of claim 5, wherein the first image sensor is positioned relative to the color separation element to:

sense light of the first intrinsic color reflected by the color separation element when the first voltage is zero, the second voltage is at the second threshold value, and the third voltage is at the third threshold value;

sense light of the second intrinsic color reflected by the color separation element when the second voltage is zero, the first voltage is at the first threshold value, and the third voltage is at the third threshold value; and sense light of the third intrinsic color reflected by the color separation element when the third voltage is zero, the first voltage is at the first threshold value, and the second voltage is at the second threshold value.

8. The image capture system of claim 5, further comprising a second image sensor that is positioned relative to the color separation element to:

sense light of the second and third intrinsic colors transmitted by the color separation element when the first voltage is zero, the second voltage is at the second threshold value, and the third voltage is at the third threshold value;

sense light of the first and third intrinsic colors transmitted by the color separation element when the second voltage is zero, the first voltage is at the first threshold value, and the third voltage is at the third threshold value; and sense light of the first and second intrinsic colors transmitted by the color separation element when the third voltage is zero, the first voltage is at the first threshold value, and the second voltage is at the second threshold value.

9. The image capture system of claim 1, wherein the first holographic polymer dispersed liquid crystal color separation medium reflects the first intrinsic color away from surface glare from one of the plurality of substrates.

10. The image capture system of claim 1, further comprising:

a first voltage source that selectively applies a first voltage to the first pair of substrates;

a second voltage source that selectively applies a second voltage to the second pair of substrates;

a third voltage source that selectively applies a third voltage to the third pair of substrates;

wherein:

when the first, second and third voltages are zero, the first, second and third holographic polymer dispersed liquid crystal color separation mediums sequentially transmit light of all intrinsic colors of the incident light;

when the first voltage has a first threshold voltage level, the first holographic polymer dispersed liquid crystal color separation medium reflects light of the first intrinsic color;

when the second voltage has a second threshold voltage level, the second holographic polymer dispersed liquid crystal color separation medium reflects light of the second intrinsic color; and when the third voltage has a third threshold voltage level, the third holographic polymer dispersed liquid crystal color separation medium reflects light of the third intrinsic color.

11. The image capture system of claim 1, wherein the image capture system comprises a digital camera.

12. An image capture system, comprising:

a color separation element including:

a plurality of substrates forming at least a first pair of adjacent 'substrates, a second pair of adjacent substrates and a third pair of adjacent substrates;

a first holographic polymer dispersed liquid crystal color separation medium formed between the first pair of substrates, the first holographic polymer dispersed liquid crystal color separation medium reflecting light of a first intrinsic color of incident light and simultaneously transmitting light of all other intrinsic colors of the incident light exclusive of the first intrinsic color;

a second holographic polymer dispersed liquid crystal color separation medium formed between the second pair of substrates, the second holographic polymer dispersed liquid crystal color separation medium reflecting light of a second intrinsic color of the incident light and simultaneously transmitting light of all other intrinsic colors of the incident light exclusive of the second intrinsic color; and a third holographic polymer dispersed liquid crystal color separation medium formed between the third pair of substrates, the third holographic polymer dispersed liquid crystal color separation medium reflecting light of a third intrinsic color of the incident light and simultaneously transmitting light of all other intrinsic colors of the incident light exclusive of the third intrinsic color;

wherein the first, second and third holographic polymer dispersed liquid crystal color separation mediums (i) sequentially reflect the first, second and third intrinsic colors, respectively, and (ii) sequentially transmit light of substantially all intrinsic colors of the incident light exclusive of the first, second and third intrinsic colors, respectively; and a first image sensor that is selectively positioned relative to the color separation element to either (i) sense the light of the first, second and third intrinsic colors that are reflected by the first, second and third holographic polymer dispersed liquid crystal color separation mediums, respectively, or to (ii) sense the light of substantially all intrinsic colors of the incident light exclusive of the first, second and third intrinsic colors that is sequentially transmitted by the first, second and third holographic polymer dispersed liquid crystal color separation mediums, respectively.

13. The image capture system of claim 12, wherein the first image sensor is positioned relative to the color separation element to sense the light of the first, second and third intrinsic colors that are sequentially reflected by the first, second and third holographic polymer dispersed liquid crystal color separation mediums, respectively.

14. The image capture system of claim 12, further comprising:

a first voltage source that selectively applies a first voltage to the first pair of substrates;

a second voltage source that selectively applies a second voltage to the second pair of substrates;

a third voltage source that selectively applies a third voltage to the third pair of substrates;

wherein:
when the first, second and third voltages are each zero, the first, second and third holographic polymer dispersed liquid crystal color separation mediums sequentially reflect light of the first, second and third intrinsic colors, respectively;
when the first voltage has a first threshold voltage level, the first holographic polymer dispersed liquid crystal color separation medium transmits light of all intrinsic colors of the incident light;
when the second voltage has a second threshold voltage level, the second holographic polymer dispersed liquid crystal color separation medium transmits light of all intrinsic colors of the incident light; and
when the third voltage has a third threshold voltage level, the third holographic polymer dispersed liquid crystal color separation medium transmits light of all intrinsic colors of the incident light.

15. The image capture system of claim 14, wherein the first image sensor is positioned relative to the color separation element to sense the light of the first, second and third intrinsic colors that are sequentially reflected by the first, second and third holographic polymer dispersed liquid crystal color separation mediums, respectively, when the first, second and third voltages are respectively zero.

16. The image capture system of claim 14, wherein the first image sensor is positioned relative to the color separation element to:
sense light of the first intrinsic color reflected by the color separation element when the first voltage is zero, the second voltage is at the second threshold value, and the third voltage is at the third threshold value;
sense light of the second intrinsic color reflected by the color separation element when the second voltage is zero, the first voltage is at the first threshold value, and the third voltage is at the third threshold value; and
sense light of the third second intrinsic color reflected by the color separation element when the third voltage is zero, the first voltage is at the first threshold value, and the second voltage is at the second threshold value.

17. The image capture system of claim 16, further comprising a second image sensor that is positioned relative to the color separation element to:
sense light of the second and third intrinsic colors transmitted by the color separation element when the first voltage is zero, the second voltage is at the second threshold value, and the third voltage is at the third threshold value;
sense light of the first and third intrinsic colors transmitted by the color separation element when the second voltage is zero, the first voltage is at the first threshold value, and the third voltage is at the third threshold value; and
sense light of the first and second intrinsic colors transmitted by the color separation element when the third voltage is zero, the first voltage is at the first threshold value, and the second voltage is at the second threshold value.

18. The image capture system of claim 12, wherein the image capture system comprises a digital camera.

19. A method of making an image capture system, comprising:
providing a lens that focuses incident light;
forming a color separation element disposed such that the incident light focused by the lens impinges on the color separation element, the forming of the color separation element including:
forming a first pair of substrates from a plurality of substrates;
forming a first holographic polymer dispersed liquid crystal color separation medium between the first pair of substrates, the first holographic polymer dispersed liquid crystal color separation medium reflecting light of a first intrinsic color of the incident light and simultaneously transmitting light of all other intrinsic colors of the incident light exclusive of the first intrinsic color;
forming a second pair of substrates from the plurality of substrates;
forming a second holographic polymer dispersed liquid crystal color separation medium between the second pair of substrates, the second holographic polymer dispersed liquid crystal color separation medium reflecting light of a second intrinsic color of the incident light and simultaneously transmitting light of all other intrinsic colors of the incident light exclusive of the second intrinsic color;
forming a third pair of substrates from the plurality of substrates;
forming a third holographic polymer dispersed liquid crystal color separation medium between the third pair of substrates, the third holographic polymer dispersed liquid crystal color separation medium reflecting light of a third intrinsic color of the incident light and simultaneously transmitting light of all other intrinsic colors of the incident light exclusive of the third intrinsic color;
wherein the first, second and third holographic polymer dispersed liquid crystal color separation mediums (i) sequentially reflect the first, second and third intrinsic colors, respectively, and (ii) sequentially transmit light of substantially all intrinsic colors of the incident light exclusive of the first, second and third intrinsic colors, respectively;
positioning a first image sensor selectively relative to the color separation element to either (i) sense the light of the first, second and third intrinsic colors that are sequentially reflected by the first, second and third holographic polymer dispersed liquid crystal color separation mediums, respectively, or to (ii) sense the light of substantially all intrinsic colors of the incident light exclusive of the first, second and third intrinsic colors that are sequentially transmitted by the first, second and third holographic polymer dispersed liquid crystal color separation mediums, respectively.

20. The method of claim 19, further comprising:
providing a first voltage source that selectively applies a first voltage to the first pair of substrates;
providing a second voltage source that selectively applies a second voltage to the second pair of substrates;
providing a third voltage source that selectively applies a third voltage to the third pair of substrates;
sequentially reflecting light of the first, second and third intrinsic colors from the first, second and third holographic polymer dispersed liquid crystal color separation mediums, respectively, when the first, second and third voltages are each zero;
transmitting light of all intrinsic colors of the incident light from the first holographic polymer dispersed liquid crystal color separation medium when the first voltage has a first threshold voltage level;
transmitting light of all intrinsic colors of the incident light from the second holographic polymer dispersed liquid crystal color separation medium when the second voltage has a second threshold voltage level; and transmitting light of all intrinsic colors of the incident light from the third holographic polymer dispersed liquid crystal color separation medium when the third voltage has a third threshold voltage level.

21. The method of claim 19, wherein the image capture system comprises a digital camera.

22. A method of separating intrinsic colors of light, comprising:

a) impinging light onto a color separation element;

b) separating light of a first intrinsic color from the light using the color separation element;

c) passing the light of the first intrinsic color to an image sensor;

d) after (c), separating light of a second intrinsic color from the light using the color separation element;

e) passing the light of the second intrinsic color to the image sensor;

f) after (e), separating light of a third intrinsic color from the light using the color separation element; and g) passing the light of the third intrinsic color to the image sensor.

23. The method of claim 22, further comprising passing the light of the first, second and third intrinsic colors to the image sensor by sequentially reflecting the light of the first, second and third intrinsic colors from the color separation element.

24. The method of claim 22, further comprising passing the light of the first, second and third intrinsic colors to the image sensor by sequentially transmitting the light of the first, second and third intrinsic colors through the color separation element.

25. The method of claim 22, further comprising simultaneously passing at least two of the first, second and third intrinsic colors from the color separation element to the image sensor.

26. The method of claim 22, wherein the color separation element comprises holographic polymer dispersed liquid crystal material that separates the light of the first, second and third intrinsic colors.

* * * * *